United States Patent
Gardner

(10) Patent No.: US 8,687,110 B1
(45) Date of Patent: Apr. 1, 2014

(54) INTELLIGENT POWER MANAGEMENT FOR ACTIVELY-COOLED CAMERAS

(75) Inventor: David W. Gardner, Colorado Springs, CO (US)

(73) Assignee: FLIR Systems, Inc., Wilsonville, OR (US)

( * ) Notice: Subject to any disclaimer, the term of this patent is extended or adjusted under 35 U.S.C. 154(b) by 229 days.

(21) Appl. No.: 13/192,239

(22) Filed: Jul. 27, 2011

Related U.S. Application Data

(60) Provisional application No. 61/491,783, filed on May 31, 2011.

(51) Int. Cl.
- *H04N 5/225* (2006.01)
- *H04N 9/64* (2006.01)
- *G03B 13/00* (2006.01)
- *G01J 5/02* (2006.01)

(52) U.S. Cl.
USPC .............. 348/372; 348/244; 396/97; 250/352

(58) Field of Classification Search
USPC .............. 348/372, 244; 396/97, 98, 301, 303, 396/231; 257/339.03, 352, 370.15, 238
See application file for complete search history.

(56) References Cited

U.S. PATENT DOCUMENTS

| | | | |
|---|---|---|---|
| 4,587,563 A * | 5/1986 | Bendell et al. | 348/244 |
| 4,739,409 A * | 4/1988 | Baumeister | 348/244 |
| 6,927,795 B1 * | 8/2005 | Cazier et al. | 348/243 |
| 7,626,616 B2 * | 12/2009 | Kokubo et al. | 348/229.1 |
| 7,755,687 B2 * | 7/2010 | Fukushima | 348/300 |
| 2004/0169771 A1 * | 9/2004 | Washington et al. | 348/374 |
| 2005/0023469 A1 * | 2/2005 | Chin et al. | 250/352 |
| 2011/0049365 A1 * | 3/2011 | Aebi | 250/332 |
| 2011/0315881 A1 * | 12/2011 | Knowles et al. | 250/352 |

FOREIGN PATENT DOCUMENTS

| | | | |
|---|---|---|---|
| JP | 2003348420 A | * | 12/2003 |
| JP | 2005354258 A | * | 12/2005 |
| JP | 2010041457 A | * | 2/2010 |

\* cited by examiner

*Primary Examiner* — John Villecco
(74) *Attorney, Agent, or Firm* — Haynes and Boone, LLP

(57) ABSTRACT

In one embodiment, a camera is provided that includes: an image sensor configured to provide an image signal; an automatic gain control (AGC) unit configured to determine an AGC control signal for controlling a gain applied to the image signal; a cooler configured to cool the image sensor; and a thermal control circuit configured to compare the AGC control signal to a threshold, wherein the thermal control circuit is further configured to turn on the cooler if the comparison indicates that the AGC control signal exceeds the threshold.

14 Claims, 2 Drawing Sheets

INTELLIGENT POWER MANAGEMENT FOR ACTIVELY-COOLED CAMERAS

CROSS-REFERENCE TO RELATED APPLICATIONS

This application claims the benefit of U.S. Provisional Application No. 61/491,783, filed May 31, 2011, the contents of which are incorporated by reference in their entirety.

TECHNICAL FIELD

The present invention relates generally to imaging, and more particularly to the management of power consumed by actively-cooled cameras.

BACKGROUND

Many imaging applications such as Short Wave Infrared (SWIR) face challenges from thermal noise. In particular, low-light conditions require longer exposure times and higher gain that exacerbate the interference produced by thermal noise. It is thus conventional to cool image sensors in demanding applications to suppress thermal noise. Since there is no room in conventional cameras for vapor-compression refrigeration systems, image sensor cooling is typically performed using a solid state thermo-electric cooler (TEC). Although a TEC is compact and readily integrates with the circuit board holding the image sensor, thermo-electric cooling is quite inefficient as compared to traditional vapor-compression refrigeration techniques.

A conventional TEC-cooled camera sensor is controlled so that the thermo-electric cooler maintains a constant image sensor temperature such as 5° C. But the amount of power consumed by a thermo-electric cooler is proportional to the difference between the ambient air temperature and the desired image sensor temperature. For example, a TEC may consume 2 watts of power if the ambient temperature is 20° C. (requiring 15 degrees of cooling to bring the image sensor to the desired 5° C.). But operating conditions can be much hotter than 20° C. For example, a camera operating in a tank in the Iraqi desert may face ambient temperatures of 80° C. At such high temperatures, the TEC can consume 30 watts to cool the image sensor to 5° C. (a 75° C. difference).

Accordingly, there is a need in the art for more efficient image sensor cooling techniques.

SUMMARY

In accordance with a first embodiment, a camera is provided that includes: an image sensor configured to provide an image signal; an automatic gain control (AGC) unit configured to determine an AGC control signal for controlling a gain applied to the image signal; a cooler configured to cool the image sensor; and a thermal control circuit configured to compare the AGC control signal to a threshold, wherein the thermal control circuit is further configured to turn on the cooler if the comparison indicates that the AGC control signal exceeds the threshold.

In accordance with a second embodiment, a method of controlling image sensor cooling is provided that includes: determining whether the image sensor is operating under low light conditions; and cooling the image sensor only if the determination indicates low light condition operation.

In accordance with a third embodiment, a camera is provided that includes: an image sensor configured to provide an image signal; a low-light determination module for determining whether the image sensor is operating under low-light conditions; a cooler configured to cool the image sensor; and a thermal control circuit configured to turn on the cooler if the low-light determination module determines that the image sensor is operating under low-light conditions.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
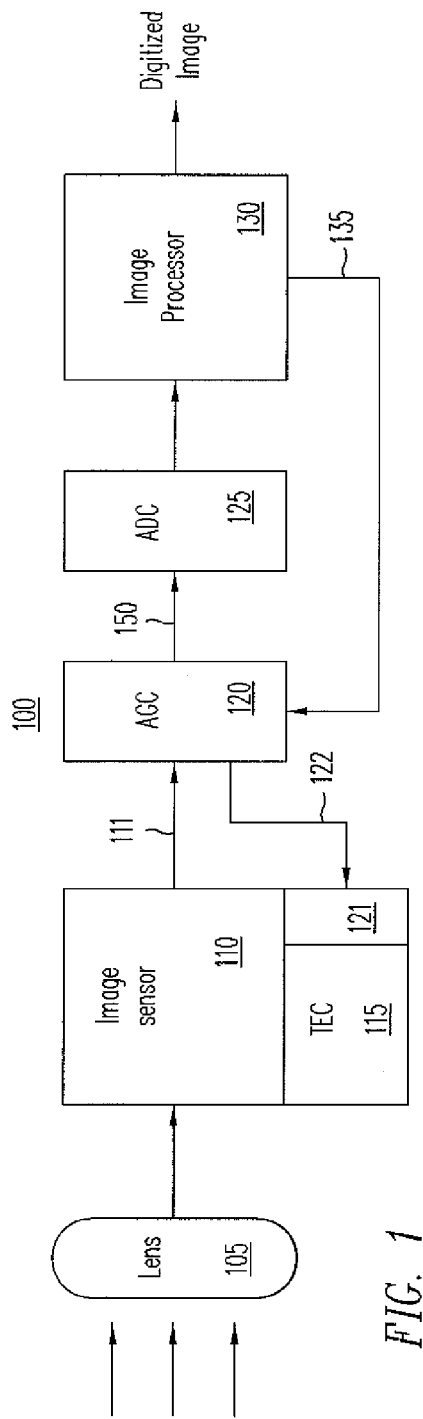
FIG. 1 is a block diagram of a camera in accordance with an embodiment of the disclosure.

A camera is disclosed that cools the image sensor based upon the ambient light as opposed to the ambient temperature to provide improved power consumption savings. Turning now to the drawings, an example camera 100 is illustrated. Camera 100 includes a lens 105 focusing light onto an image sensor 110. It will be appreciated that image sensor 110 need not be limited to a SWIR image sensor but may comprise a visible light CMOS sensor or other suitable types of image sensors. A cooler such as a thermoelectric cooler (TEC) 115 cools image sensor 110 responsive to the ambient light conditions as described further herein. An analog image signal from sensor 110 is gain adjusted as necessary through an automatic gain control (AGC) unit 120 and digitized in an analog-to-digital converter (ADC) 125. An image processor 130 processes the resulting raw digital signal from ADC 125 to produce the desired digitized image signal.

During daylight operation, image sensor 110 receives sufficient light such that AGC 120 need not activate. As known in the art, automatic gain control controls the gain applied to some input signal based upon feedback from a resulting output signal. In the case of camera 100, the automatic gain control feedback may arise from image processor 130. In that regard, each pixel in the digitized image from image processor 130 has some dynamic range—for example, if the dynamic range is 8 bits, each pixel value can range from zero to 255. The image would be completely saturated if each 8-bit pixel had a value of 255 and would be totally dark if each pixel had a value of zero. Thus, image processor 130 may provide a feedback reference signal 135 to AGC unit 120 that represents an average pixel value.

Figure 2:
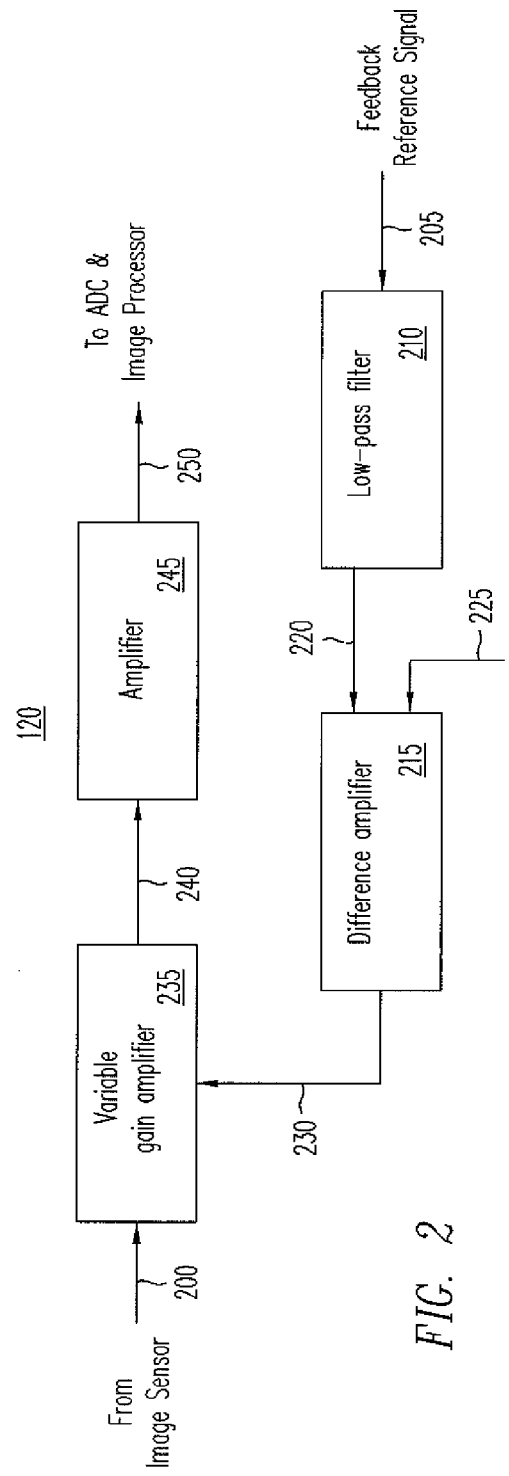
FIG. 2 is a block diagram for the automatic gain control unit in the camera of FIG. 1.

An example embodiment for AGC unit 120 is shown in more detail in FIG. 2. AGC unit 120 is a negative feedback system that that controls the amount of gain applied to an image signal 111 from image sensor 110 of FIG. 1. The automatic gain control may be performed in the analog domain or in the digital domain. In the embodiment shown in FIG. 2, AGC unit 120 performs the gain control in the analog domain so a feedback reference signal 205 represents an analog version of feedback reference signal 135 of FIG. 1. A low-pass filter 210 filters out any undesirable high frequency variation in feedback reference signal 205 so that a difference amplifier 215 may compare a resulting filtered feedback reference signal 220 to a reference signal 225. Difference amplifier 215 produces a control signal 230 that represents an amplified version of the difference between signals 220 and 225. AGC control signal 230 controls the gain applied to input image signal 200 by a variable gain amplifier 235, which produces a variably amplified image signal 240 accordingly. An optional static amplifier 245 introduces additional gain to provide amplified image signal 150. As shown in FIG. 1, amplified image signal 150 is then digitized and processed in image processor 130 so as to determine the average pixel value.

During daylight operation, the average pixel value and hence feedback reference signal 205 is such that AGC unit 120 needs only to provide a baseline amount of gain in variable gain amplifier 235. But as daylight fades, the average pixel value drops below the desired reference value, whereupon control signal 122 within AGC unit 120 increases the gain applied to input image signal 111. Conversely, as light intensity increases, control signal 122 would decrease the amount of gain applied to input signal 200.

It will thus be appreciated that AGC control signal 122 acts as a proxy for indicating whether it is daylight or nighttime. Since thermal noise is most problematic at low light conditions when gain is high, dramatic power savings are realized by controlling TEC 115 operation responsive to the amplitude for AGC control signal 122. Referring back to FIG. 1, a TEC control circuit 121 compares AGC control signal 122 to a control signal threshold value. The threshold value may be predetermined or may be adaptively determined responsive to the image quality. When AGC control signal 122 exceeds the control signal threshold value, TEC control circuit 121 turns on TEC 115 to cool image sensor 110. If AGC control signal 122 then drops below the threshold value, control circuit 121 turns off TEC 115 to save power. In contrast, a conventional ambient-temperature controlled operation of TEC 115 would expend power during daylight operation even through the image quality is sufficient without thermal cooling due to the ample light incident on image sensor 110 in daylight conditions. In this fashion, the average power consumption for camera 100 may be one-half to one-third of the power consumption in conventional TEC-cooled camera operation.

It will be appreciated that automatic gain control could also occur in the digital domain. For example, a digital gain may be applied via a histogram stretching or other suitable technique on the digitized image. As known in the arts, histogram stretching may be applied, for example, to an underexposed image that would result from low-light conditions. The relatively weak image signal in such a case would occupy the lower part of the total dynamic range. For example, consider again an example embodiment in which each image pixel has a dynamic range of 8 bits such that any given pixel has a digital value ranging from zero to 255. In a low-light condition without analog AGC, the relatively weak image signal may be such that a histogram for the pixel values shows that most of the pixels are concentrated in a low range such as from zero to 50. Histogram stretching may then be applied to increase image quality by better occupying the available dynamic range. The amount of histogram stretching that is applied may thus be considered as a digital gain. Regardless of where the gain is controlled, the amount of gain applied is responsive to some sort of control signal. The control signal thus serves as a proxy for determining whether external lighting conditions are such that the image sensor should be cooled.

Figure 3:
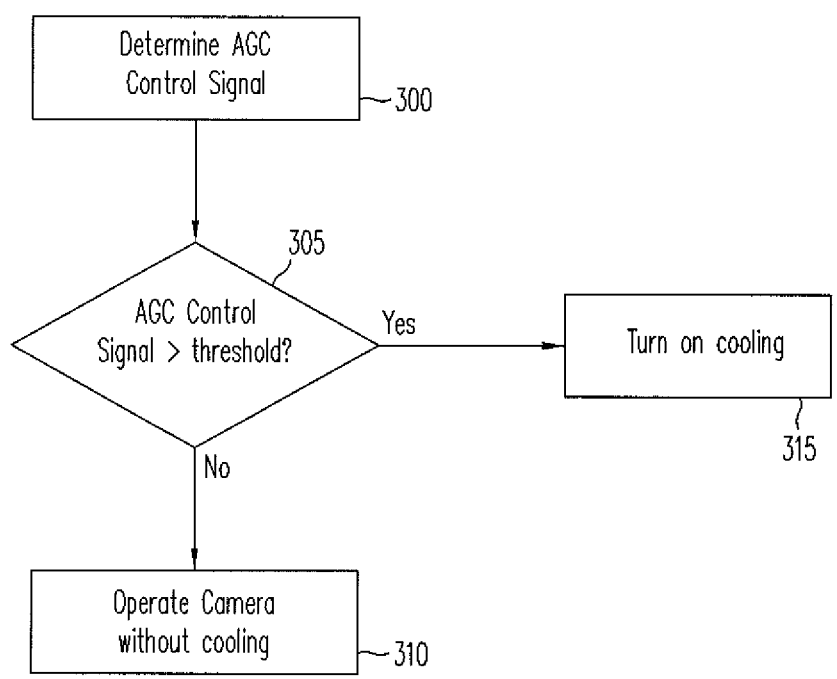
FIG. 3 is a flowchart illustrating the TEC control applied by the camera of FIG. 1.

FIG. 3 is a flowchart for the resulting TEC control implemented by camera 100 of FIG. 1. In an initial step 300, AGC unit 120 determines a current value for AGC control signal 122 by comparing an image feedback signal to an AGC reference value. As discussed with regard to FIG. 1, the image feedback signal may be an average pixel value for the digitized image or it may be some other measure of image intensity. The AGC reference value represents the desired signal intensity that is to be maintained by AGC unit 120.

In a step 305, the AGC control signal is compared to a thermal control threshold value. The thermal control reference value is a gain control signal value at which the thermal noise becomes significant as compared to the much weaker input signal received by image sensor 110 during nighttime conditions. Should step 305 indicate that the AGC control signal is less than the thermal control reference value, the camera operates without cooling as indicated by step 310. Conversely, should step 305 determine that the AGC control signal is greater than the thermal control reference value, TEC 115 is turned on in a step 315 so that the camera operates with cooling.

It will be appreciated that other proxies for determining whether nighttime conditions exist may be used. For example, image processor 130 may calculate the signal-to-noise ratio for the input image signal to image sensor 110 by calculating an average variance for the pixel values in the resulting digitized image. Image processor 130 may then compare the input image signal-to-noise ratio to a threshold value to determine whether nighttime conditions exist. In that regard, step 300 of FIG. 2 may be generalized as determining whether nighttime conditions exist based upon examination of a suitable proxy signal. Step 305 would thus be modified accordingly to compare the proxy signal to a proxy signal threshold. Based upon this comparison, either cooled or non-cooled operation of the camera ensues as discussed with regard to steps 315 and 310. The module determining whether the proxy indicates that nighttime conditions exist may be denoted as a low-light determination module. For example, in camera 100 of FIG. 1, AGC unit 120 would comprise a low-light determination module. In an alternative embodiment, an image processor configured to compare the signal-to-noise for an image signal to a reference value would comprise the low-light determination module.

The resulting control of TEC 115 is binary—it is either left off or turned on based upon the comparison of an imaging-derived nighttime proxy signal to a suitable threshold. However, in an alternative embodiment, the control of TEC 115 could be analog. The amount of current driven into TEC 115 may be varied proportionally to the proxy signal. For example, the current driving TEC 115 may be made proportional to AGC control signal 122 such that as AGC control signal 122 increased from the nominal gain state, the TEC power would increase accordingly.

The above-described embodiments of the present invention are thus representative of many possible embodiments. It will be apparent to those skilled in the art that various changes and modifications may be made to what has been disclosed without departing from this invention. The appended claims encompass all such changes and modifications as fall within the true spirit and scope of this invention.

What is claimed is:
1. A camera, comprising:
an image sensor configured to provide an image signal;

an automatic gain control (AGC) unit configured to determine an AGC control signal for controlling a gain applied to the image signal;

a cooler configured to cool the image sensor; and a thermal control circuit configured to compare the AGC control signal to a threshold, wherein the thermal control circuit is further configured to turn on the cooler if the comparison indicates that the AGC control signal exceeds the threshold, and wherein the threshold is adaptively adjusted.

2. The camera of claim 1, wherein the image sensor is a short wavelength infrared (SWIR) image sensor.

3. The camera of claim 1, wherein the image sensor is a CMOS visible light image sensor.

4. The camera of claim 1, further comprising:

an analog-to-digital converter for converting the image signal into a digital signal.

5. The camera of claim 4, further comprising an image processor configured to process the digital signal into a digitized image signal.

6. The camera of claim 5, wherein the image processor determines a feedback signal from the digitized image signal.

7. The camera of claim 6, wherein the AGC unit compares the feedback signal to an AGC reference signal to determine the AGC control signal.

8. A method of controlling image sensor cooling, comprising:

determining whether a signal-to-noise ratio for an image signal exceeds a signal to noise ratio signal threshold to determine whether an image sensor is operating under low light conditions; and cooling the image sensor only if the determination indicates low light condition operation.

9. The method of claim 8, wherein the low light condition is a nighttime condition.

10. The method of claim 8, wherein the image sensor is a short wavelength infrared (SWIR) image sensor.

11. The method of claim 8, wherein the image sensor is a CMOS visible light image sensor.

12. The method of claim 8, wherein cooling the image sensor comprises cooling the image sensor with a thermoelectric cooler.

13. A camera, comprising:

an image sensor configured to provide an image signal;

an image processor configured to determine whether a signal-to-noise ratio for the image signal exceeds a signal to noise ratio signal threshold to determine whether the image sensor is operating under low-light conditions;

a cooler configured to cool the image sensor; and a thermal control circuit configured to turn on the cooler if the image processor determines that the image sensor is operating under low-light conditions.

14. The camera of claim 13, wherein the image processor determines whether the image sensor is operating under low-light conditions responsive to a histogram stretching operation.

* * * * *